Oct. 16, 1951 E. W. DYER 2,571,222
FISH LURE
Filed Oct. 13, 1950
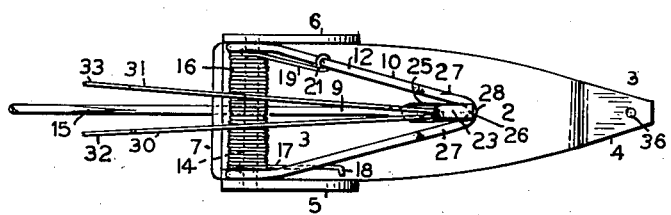
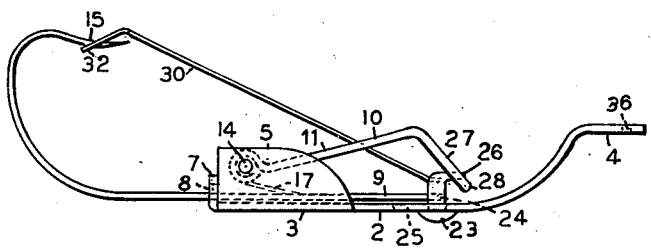
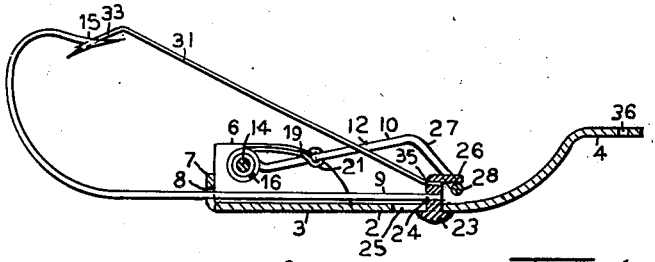
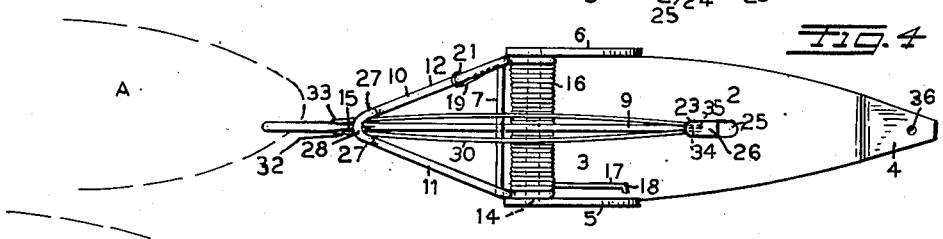
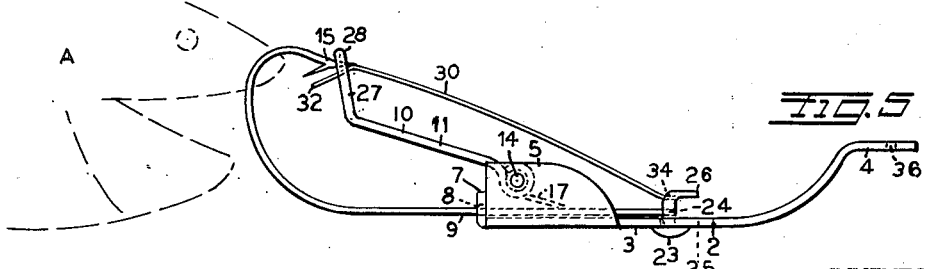
INVENTOR
EDWARD WAYNE DYER
BY *Edward M Fisher* ATTORNEY Patented Oct. 16, 1951

2,571,222

UNITED STATES PATENT OFFICE 2,571,222

FISH LURE

Edward Wayne Dyer, Winter Haven, Fla.

Application October 13, 1950, Serial No. 189,971

2 Claims. (Cl. 43—34)

This invention relates to fish lures.

An object of this invention is to provide a new and improved lure in the form of a spoon carrying a hook and having a snap member maintained in set position by a trigger mechanism which is released when the hook is struck by a fish causing said member to be seated on the barbed end of said hook thereby preventing throwing of the hook by the fish.

A further object is to provide a lure of the above character, whereby, as the snap member is seated on the barbed end of the hook, wire weed guards are gathered to the hook bill.

Other objects and advantages of the invention will be apparent during the course of the following description.

This invention resides substantially in the combination, construction, arrangement and relative location of parts, all in accordance with the disclosure herein.

In the accompanying drawings:

Figure 1 is a plan view of a lure in accordance with this invention, same being shown with the trigger mechanism set, Figure 2 is a side elevation thereof, Figure 3 is a central vertical longitudinal section thru the same, Figure 4 is a plan view with trigger mechanism inactive, Figure 5 is a side elevation thereof.

The true nature and manner of use of a lure in accordance with this invention will be best understood by a detailed description of the form thereof shown in the drawings in an illustrative sense.

Now referring more particularly to the drawings for illustration, the lure device comprises a spoon type metal body portion 2 the base of which is flat with a horizontal portion 3 and therefrom of a longitudinal curved contour to the forward end thereof 4, the edges of said base being curved inward and forward from side flange portions 5 and 6, to tapered edges of end 4. The rear spoon end is flanged 7 said flange being slotted as at 8 for longitudinal sliding movement therethru of hook stem 9 carried by the spoon for setting and releasing trigger mechanism as hereinafter set forth.

Means to prevent a fish A, illustrated in dash lines, from throwing a hook rests in a looped member 10 of substantially V shape and having the ends of its legs 11 and 12 pivotally engaged on opposite ends of shaft 14 for swinging movement of the member as between the spoon and the bill of the hook 15, the opposite ends of said shaft being journalled in the side flanges 5 and 6 of the spoon member.

Mounted on the shaft 14 and interposed between the pivoted ends of legs 11 and 12 of member 10 is a coil spring 16. Outer ends of the coil spring are extended, end 17 formed with an angular terminus 18 which abuts against the base of the spoon, and end 19 engaged upon leg 12 of member 10 as at 21. The normal tendency of spring 16 is to seat the member 10 on the hook bill 15, as shown in Figures 4 and 5, said action being had thru said spring end engagements.

Looped member 10 is angled as at 27, thus a downward pull is exerted on member 10 under tension of coil spring 16 when the loop thereof 28 is seated on the slightly concaved bill 15 of the hook thus preventing unseating of the member 10 by an attempt on the part of a fish A to throw the hook.

To set the member 10, when same is swung to the spoon base, Figures 1 and 2, against the tension and normal tendency of the coil spring 16 I provide a trigger member 23 fixedly engaged upon the end of the hook stem or shank 9 as at 24, and therefore slidable with the longitudinal movement of the hook, within the limits of slot 25 in the spoon base, said trigger member having a lip 26 for setting engagement over the looped end 28 of the member 10.

Reference to the drawings will teach that embodied with this device are weed guards 30 and 31, of suitable spring wire, the forward ends of which are fixedly engaged with trigger member 23 as at 34 and 35, respectively, said guard wires being outwardly expanded fanwise from the trigger engagement, Figure 1, and bent angularly downward at their free ends 32 and 33, respectively.

In the use of this device same is cast after setting of looped member 10 to the spoon by the forward longitudinal movement of the hook and trigger mechanism carried thereby and previously described, when the hook is struck by a fish A the pull on the hook releases the trigger mechanism causing, under tension of spring 16, a snap swing of looped member 10 to its seating on the bill portion 15 of the hook, however, in the swing of the member 10 to its seat contact is made thereby with the free ends of weed guard wires 30 and 31 and thru means of the V shape of member 10 the angular ends 32 and 33, respectively, are wedged in from their normal fanwise position by legs 11 and 12 thereby preventing the hook from catching in weeds, or other obstructions.

For line engagement with the lure there is provided an aperture 36 in portion 4 of the spoon.

It is believed that the many advantages of a lure in accordance with this invention will be readily understood, and although a preferred embodiment is as illustrated and described, it is to be understood that modifications and changes in the details of construction may be had which fall within the scope of the invention as claimed.

What is claimed:

1. A fish lure, comprising, a body forming a spoon, a hook having a bill and a stem slidably fitting the body, a springy guard cooperating with the bill of the hook and carried by its stem, a swingable V-shaped loop member movable to and from the bill of the hook, means tensioning the loop member, and a trigger slidable with the hook and normally latching the loop member against movement and for holding the same removed from the bill of the hook, the bill of said hook lying within the arc of movement of said swingable V-shaped loop member.

2. A fish lure, comprising, a body forming a spoon, a hook having a bill and a stem slidably fitting the body, a springy guard cooperating with the bill of the hook and carried by its stem, a swingable V-shaped loop member movable to and from the bill of the hook, means tensioning the loop member, a trigger slidable with the hook and normally latching the loop member against movement and for holding the same removed from the bill of the hook, and means connecting the trigger and hook stem slidably fitted to the spoon, the bill of said hook lying within the arc of movement of said swingable V-shaped loop member.

EDWARD WAYNE DYER.

REFERENCES CITED

The following references are of record in the file of this patent:

UNITED STATES PATENTS

| Number | Name | Date |
| --- | --- | --- |
| 839,611 | Martin | Dec. 25, 1906 |
| 2,054,976 | Gould | Sept. 22, 1936 |
| 2,149,923 | Martin | Mar. 7, 1939 |
| 2,385,986 | Helfenstein | Oct. 2, 1945 |